No. 840,860. PATENTED JAN. 8, 1907.
O. MÜLLER.
FAUCET.
APPLICATION FILED OCT. 16, 1905.

Witnesses
Chas H Smith

Inventor
Otto Müller.
per Harold Serrell

UNITED STATES PATENT OFFICE.

OTTO MÜLLER, OF NEW YORK, N. Y.

FAUCET.

No. 840,860.　　　Specification of Letters Patent.　　　Patented Jan. 8, 1907.

Application filed October 16, 1905. Serial No. 282,913.

*To all whom it may concern:*

Be it known that I, OTTO MÜLLER, a citizen of the United States, residing at the borough of Brooklyn, in the county of Kings, city and State of New York, have invented an Improvement in Faucets, of which the following is a specification.

My invention relates to faucets; and the object thereof is the provision of an improved faucet in which means actuated by the pressure in the pipes or otherwise are provided for shutting off the water or other supply of liquid at a point within the faucet and before the liquid reaches the main valve of the faucet, which normally controls the flow through the same, whereby the water or other liquid may be shut off for cleaning or repairing the faucet without disturbing the pressure and consequent flow at any other point in the system of which the particular faucet is a member. I may also provide my improved faucet with a chamber adapted to receive a vessel filled with suitable filtering material and so situated in relation to the main valve as to cause the water or other liquid flowing through the faucet to first pass through this vessel and the filtering material therein.

In carrying out my invention I employ a faucet having a body portion provided with a tubular shank and bib-nose, with the intervening valve-stem and handle therefor, as is customary, and in the tubular shank I preferably employ an auxiliary valve adapted to seat automatically, means for normally maintaining said valve in its open position, and a filter-chamber through which the liquid must pass in flowing through the faucet.

Figure 1:
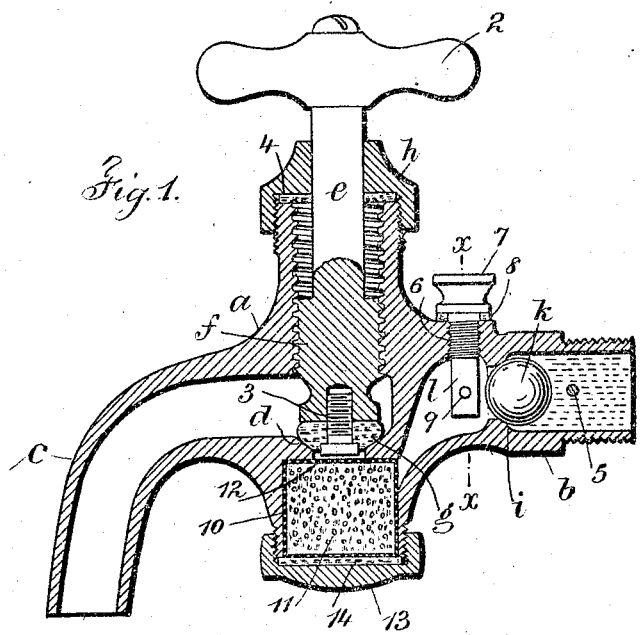
Figure 2:
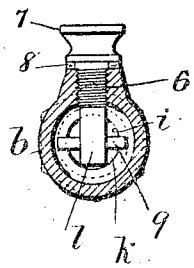

In the drawings, Figure 1 is a central section of my improved faucet; and Fig. 2 is a cross-section on line *x x*, Fig. 1.

*a* designates the body portion of the faucet, which, as is customary, is provided with a tubular shank *b*, a bib-nose *c*, a valve-seat *d*, a valve-stem *e*, provided with an enlarged screw-threaded portion *f*, adapted to be received in the screw-threaded bore of the faucet-body. At one end the valve-stem *e* is provided with a suitable handle 2 and at the other end with a washer *g*, of rubber or other suitable material, secured in position thereon by a screw 3 or otherwise and adapted to bear against the valve-seat *d*, and *h* is a cap surrounding the valve-stem *e* and fitting over the upper end of the faucet-body, with an intervening washer 4 to insure a water-tight joint between these parts.

Within the shank *b* I provide a valve-seat *i* and employ an auxiliary valve, which is preferably a ball-valve *k*, adapted to be forced against the said seat *i* by the pressure in the pipes, and the limit of travel of this ball-valve *k* in the opposite direction is restricted by means of the pin 5, passing centrally through the tubular shank *b* or otherwise. Immediately forward of the ball-valve *k* I employ a pin *l*, which passes through a tapped opening in the body portion of the faucet and is provided throughout a portion of its length with screw-threads 6, adapted to engage the screw-threads in the said opening in the body of the faucet. The body portion at this tapped opening is of increased thickness, as shown, over the adjacent portions of the body of the faucet, so as to provide a liberal thread and bearing for the pin *l*, which is suspended therein, the lower end of the pin coming, as shown especially in Fig. 2, about on a line with the opening at the seat of the ball-valve *k*.

Exteriorly of the faucet-body the pin *l* is provided with a head or a thumb-screw 7, between the under surface of which and the adjacent portion of the faucet-body I prefer to employ a washer 8, and adjacent to the other or inner end of the pin *l* I employ a cross-arm 9, preferably passing transversely through the pin in such a position as to be adapted upon the turning of said pin on the screw-thread 6 to contact with the ball-valve *k* to force the valve off its seat and maintain the same in an unseated position, thereby permitting the water or other liquid to enter the body of the faucet, which, it will be readily understood, is the normal relation of these parts. I may also provide the body portion of the faucet directly beneath the main valve with a suitable chamber adapted to receive a vessel 10, made of wire-gauze of a suitable mesh or of other material and adapted to contain gravel, sponge, or other filtering material 11, in which instance I prefer to employ a strip of wire-guaze material 12 across the aperture closed by the valve *g*, and the vessel 10, with its filtering material, may be held in position in the said chamber within the faucet-body by means of a cap 13 and an intervening washer 14, which, as will be readily understood, provide for water-tight joint between these parts.

In the employment of my improved faucet as hereinbefore described it will be apparent that normally the ball-valve *k* is maintained in an unseated position by means of the cross-arm 9, carried by the pin 11, and should it become necessary to replace either the washer g, the washers 4 or 14, or to renew the filtering material the change may be effected after turning the pin l, whereby the valve k is seated automatically, shutting off the liquid at this point without making it necessary to shut off the pressure at any other point, thereby making the system unavailable, due to repairs at a given point thereof.

I claim as my invention—

1. A faucet comprising an integral body portion, bib and shank, a main valve in the body portion and a means for operating the same, a ball-valve and a seat for the same within the shank, a suspended pin extending through and supported by the body portion of the faucet and located between the main and ball valves and immediately in front of the ball-valve, and a device connected with said pin and adapted when the pin is turned to be moved into the path of the ball-valve to bear against and unseat the ball-valve and to retain it in an unseated position.

2. A faucet comprising an integral body portion, bib and shank, a main valve in the body portion and a means for operating the same, a ball-valve and a seat for the same within the shank a suspended pin extending through and supported by the body portion of the faucet and located between the main and ball valves and immediately in front of the ball-valve, a device connected with said pin and adapted when the pin is turned to be moved into the path of the ball-valve to bear against and unseat the ball-valve and to retain it in an unseated position and a pin 5 passing transversely through the shank and appreciably back of the ball-valve so as to limit the rearward movement thereof.

3. A faucet comprising an integral body portion, bib and shank, a main valve in the body portion and a means for operating the same, a ball-valve and a seat for the same within the shank, a suspended pin l occupying a vertical position between the main and ball valves with a threaded portion in and supported by the body of the faucet, a thumb screw 7 outside of the body portion with a washer between the thumb-screw and the surface of the body of the faucet, a cross-arm 9 passing transversely through the pin in a horizontal plane through the center of the ball-valve and adapted upon the turning of the pin and in one position to come in contact with the ball-valve to unseat the valve and maintain the same in an unseated position.

4. A faucet comprising a body portion, bib and shank, a main valve, means for operating the same, means for stopping the flow of the liquid through the faucet before the same reaches the main valve, means for normally maintaining the aforesaid means in an open position, a filter device adapted to fit into the chamber adjacent to the main valve in the faucet-body and means for holding and maintaining the filter device within the faucet-body.

5. A faucet comprising a body portion, a bib and shank, a main valve, means for operating the same, means for stopping the flow of liquid through the faucet before the same reaches the main valve, means for normally maintaining the aforesaid means in an open position, a wire-gauze receptacle adapted to fit into a chamber adjacent to the main valve in the faucet-body, filtering material within said receptacle, and means for maintaining the said receptacle and filtering material in position within the said faucet-body.

6. A faucet comprising a body portion, a bib and shank, a main valve, means for operating the same, a ball-valve, a seat for the same within the said shank, a pin extending through the body portion of the faucet immediately in front of the said ball-valve, a cross-arm adapted upon turning the said pin to bear against and normally maintain the said ball-valve away from its seat, a wire-gauze receptacle adapted to fit into the chamber beneath the main valve in the faucet-body, filtering material within the said receptacle, and means for maintaining the receptacle and filtering material in position beneath the main valve and between the same and the ball-valve.

Signed by me this 9th day of October, 1905.

OTTO MÜLLER.

Witnesses:
 GEO. T. PINCKNEY,
 BERTHA M. ALLEN.